United States Patent
Pegolotti et al.

(10) Patent No.: US 11,995,010 B2
(45) Date of Patent: May 28, 2024

(54) ADAPTOR STORAGE SYSTEM OF AND METHOD

(71) Applicant: Avago Technologies International Sales Pte. Limited, Singapore (SG)

(72) Inventors: Marc Pegolotti, San Jose, CA (US); Kenny Wu, San Jose, CA (US); Ravi Shenoy, San Jose, CA (US); Gregorio Gervasio, Jr., San Jose, CA (US); Lalit Chhabra, San Jose, CA (US); Mark Karnowski, Irvine, CA (US); James Winston Smart, Irvine, CA (US); Vuong Cao Nguyen, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 340 days.

(21) Appl. No.: 17/232,944

(22) Filed: Apr. 16, 2021

(65) Prior Publication Data

US 2022/0334985 A1    Oct. 20, 2022

(51) Int. Cl.
*G06F 13/28*       (2006.01)
*G06F 12/0806*  (2016.01)
*G06F 12/1009*  (2016.01)
*G06F 13/16*       (2006.01)

(52) U.S. Cl.
CPC ...... *G06F 13/1668* (2013.01); *G06F 12/0806* (2013.01); *G06F 12/1009* (2013.01); *G06F 13/28* (2013.01); *G06F 2212/608* (2013.01)

(58) Field of Classification Search
CPC .................................................. G06F 13/1668
USPC ......................................................... 710/22
See application file for complete search history.

(56) References Cited

U.S. PATENT DOCUMENTS

| | | | | |
|---|---|---|---|---|
| 5,623,672 | A * | 4/1997 | Popat | G06F 13/362 710/111 |
| 7,219,347 | B1 * | 5/2007 | Waddington | G06F 9/4881 718/104 |
| 7,602,774 | B1 * | 10/2009 | Sundaresan | H04L 47/10 370/381 |
| 9,058,490 | B1 * | 6/2015 | Barker | G06F 21/566 |
| 2007/0174851 | A1 * | 7/2007 | Smart | G06F 3/0605 719/324 |

(Continued)

OTHER PUBLICATIONS

European Search Report on EP Appln 22167883.2 dated Sep. 13, 2022.

(Continued)

*Primary Examiner* — Titus Wong
(74) *Attorney, Agent, or Firm* — Foley & Lardner LLP (57) ABSTRACT

Systems and methods relate to a bus adapter for a storage network. The bus adaptor includes a context memory comprising a first storage for uncacheable exchange resource indicators (XRI) and a second storage for cacheable XRI. The bus adapter also includes a host backing store unit configured to provide access to the different tier memories present locally or externally in the host memory extension using several caching sub-units and with the capability of an optional pinning operation for the cacheable XRI based upon at least one of input/output phase, first in line up to a limit, a region of a virtual context address associated with the cacheable XRI indicators, a protocol associated with the cacheable XRI, a size of a transaction, or work queue information.

22 Claims, 5 Drawing Sheets

(56) References Cited

U.S. PATENT DOCUMENTS

| | | | |
|---|---|---|---|
| 2009/0175159 A1* | 7/2009 | Bertrand | H04W 72/23 370/203 |
| 2009/0196242 A1* | 8/2009 | Sambhwani | H04W 74/002 370/329 |
| 2013/0117427 A1* | 5/2013 | Amano | H04L 61/50 709/223 |
| 2015/0263827 A1* | 9/2015 | Lee | H04L 5/0053 370/329 |
| 2017/0048847 A1* | 2/2017 | Bertrand | H04W 72/23 |

OTHER PUBLICATIONS

Wachob Get Al: "Extensible Resource Identifier (XRI) Resolution V2 . 0 " Internet Citation, Mar. 18, 2005 (Mar. 18, 2005), pp. 1-74.

* cited by examiner

ADAPTOR STORAGE SYSTEM OF AND METHOD

FIELD OF THE DISCLOSURE

This disclosure generally relates to computer networking, storage networking and communications. Some embodiments of the present disclosure are related to systems for and methods of more efficiently storing exchange contexts in networks.

BACKGROUND OF THE DISCLOSURE

In the last few decades, the market for network communications devices has grown by orders of magnitude, fueled by the use portable devices, and increased connectivity and data transfer between all manners of devices. Digital switching techniques have facilitated the large scale deployment of affordable, easy-to-use communication networks including storage networks (e.g., storage area networks (SANs)). Wireless communication may operate in accordance with various standards such as IEEE 802.11x, IEEE 802.11ad, IEEE 802.11ac, IEEE 802.11n, IEEE 802.11ah, IEEE 802.11aj, IEEE 802.16 and 802.16a, Bluetooth, global system for mobile communications (GSM), code division multiple access (CDMA), and cellular technologies.

SANs connect computer data storage to servers in commercial data centers. SANs can use a Fibre Channel (FC) protocol which is a high-speed data transfer protocol providing in-order, lossless delivery of raw block data. Offloading storage input/output (I/O) exchanges require a FC adaptor or other type of network adapter to keep track of the state of each I/O exchange in a set of exchange contexts. Storing exchange contexts uses valuable on-chip memory.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF EMBODIMENTS

The following IEEE standard(s), including any draft versions of such standard(s), are hereby incorporated herein by reference in their entirety and are made part of the present disclosure for all purposes IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s). Some standards may relate to storage area networks (SANs) for connecting computer data storage to servers in commercial data centers. SANs can use a Fibre Channel (FC) standard/protocol, small computer system interface (SCSI) interface standard/protocol, asynchronous transfer mode (ATM) protocol, and synchronous optical networking protocol (SONET), all of which are incorporated herein by reference in their entireties.

For purposes of reading the description of the various embodiments below, the following descriptions of the sections of the specification and their respective contents may be helpful. Section A describes a network environment and computing environment which may use data from SANs practicing embodiments described herein, and Section B describes embodiments of systems for and method for reducing on-chip memory requirements for I/O exchange contexts and an on-chip structure for host backed storage.

Some embodiments of the systems and methods can utilize a Fibre-Channel (FC) or network adapter to keep track of the state of each I/O exchange in a set of exchange contexts. As bandwidth demand and latency increases in a system, the number of outstanding I/O exchanges in the system increases to fill the network/system pipeline to maximize network/link utilization. As a result, a large number of exchange contexts are maintained for offloading outstanding I/O exchanges on the adapter. Some embodiments of the systems and methods reduce expense (in terms of die size, cost and power) associated with memory resources for offloading a large number of outstanding I/O exchanges. In some embodiments, on-chip memory usage is extended into host memory without increasing the size of on-chip memory and uses multi-tier memory structures for multi-tier exchange offloads.

In some embodiments, a tier one pool provides a number of uncacheable exchange contexts that are always on-chip, which is optimized for performance with low latency operations, and a tier two pool provides a number of cacheable exchange contexts that can be on-chip or in host memory for scalability. In some embodiments, a number of contexts may be pinned on-chip to eliminate or reduce cache misses during I/O operations. The tier selection can be accomplished manually or automatically.

Some embodiments relate to a method of communicating in a storage network. The method includes receiving a request for an exchange resource indicator (XRI) at an adapter for a storage network, providing the exchange resource indicator from a first storage in the adapter if the exchange resource indicator is within a first range, and providing the exchange resource indicator from a second cache in the adapter if the exchange resource indicator is within a second range and is stored on the second cache. The method also includes providing the exchange resource indicator from a host memory if the exchange resource indicator is within a second range and is not stored on the second cache.

In some embodiments, the method uses a pinning operation. The pinning operation can involve one or more of pinning the exchange resource indicator in the second cache for a particular input/output exchange phase, pinning the exchange resource indicator in the second cache based on a first-come first-served basis, provided a pin limit has not been reached, pinning the exchange resource indicator in the second cache based on address if a request is within a certain programmable virtual context address (VCA) range, pinning the exchange resource indicator in the second cache based on the size of the request being within certain programmable PIN I/O size ranges, pinning the exchange resource indicator in the second cache based on an XRI number associate with the request being within a certain XRI range, pinning the exchange resource indicator in the second cache based on a fibre channel protocol, pinning the exchange resource indicator in the second cache based on a WQ profile configuration, or pinning the exchange resource indicator in the second cache based on a PIN bit directed by a host driver.

Some embodiments relate to bus adapter for a storage network. The bus adaptor includes a context memory comprising a first storage for uncacheable exchange resource indicators and a second storage for cacheable exchange resource indicators. The bus adaptors also includes a host backing store (HBS) unit configured to provide a pinning operation for the cacheable exchange resource indicators based upon at least one of input/output phase, first in line up to a limit, a region of a virtual context address associated with the cacheable exchange resource indicators, a protocol associated with the cacheable exchange resource indicators, a size of a transaction associated with the cacheable exchange resource indicators, or work queue information associated with the cacheable exchange resource indicators.

Some embodiments relate to a host bus adapter for a storage network comprising a host. The host bus adapter includes a context memory including a first storage for uncacheable exchange resource indicators and a second storage for cacheable exchange resource indicators. The host bus adapter also includes a host backing store unit configured to provide an exchange resource indicator from the first storage if the exchange resource indicator is within a first range in response to a request. The host backing store unit is also configured to provide the exchange resource indicator from a second cache in the adapter if the exchange resource indicator is within a second range and is stored on the second cache in response to the request. The host backing store unit is also configured to provide the exchange resource indicator from the host memory if the exchange resource indicator is within a second range and is not stored on the second cache in response to the request.

A. Computing and Network Environment

Figure 1A:
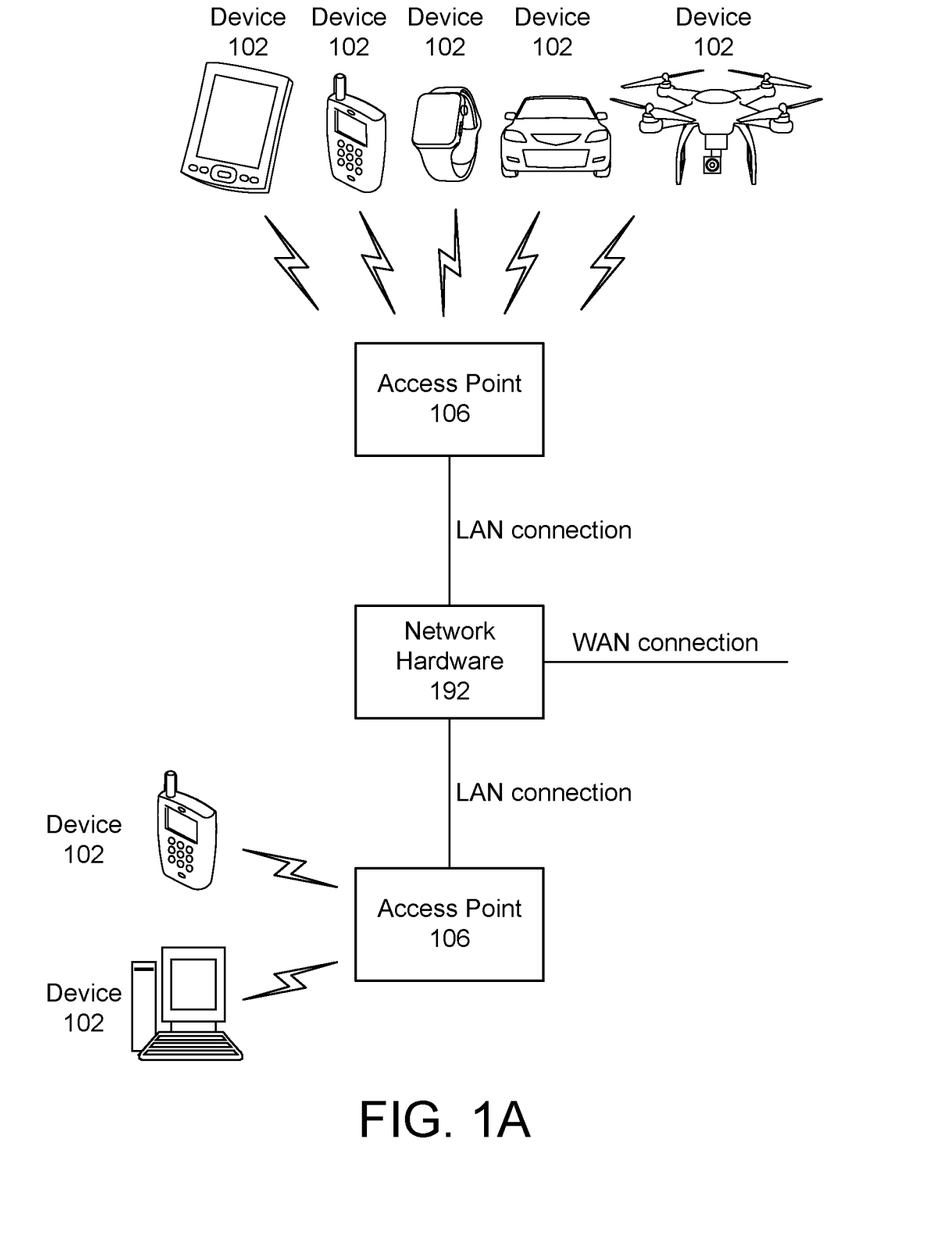
FIG. 1A is a block diagram depicting an embodiment of a network environment including one or more access points in communication with one or more wireless devices or stations.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. The network include or be in communication with a SAN, security adapters, or ethernet converged network adapter (CAN). In brief overview, the network environment includes a wireless communication system that includes one or more access points 106, one or more wireless communication devices 102 and a network hardware component 192. The wireless communication devices 102 may for example include laptop computers 102, tablets 102, personal computers 102, wearable devices 102, vehicles 102 (e.g., automobiles, drones, smart vehicles, robotic units, etc.) and/or cellular telephone devices 102. The details of some embodiments of wireless communication devices 102 and/or access point 106 are described in greater detail with reference to FIGS. 1B and 1C. The network environment can be an ad hoc network environment, an infrastructure wireless network environment, a wired network coupled to a wireless network, a subnet environment, etc. in one embodiment.

The access points (APs) 106 may be operably coupled to the network hardware 192 via local area network connections. The network hardware 192, which may include a router, gateway, switch, bridge, modem, system controller, appliance, etc., may provide a local area network connection for the communication system. Each of the access points 106 may have an associated antenna or an antenna array to communicate with the wireless communication devices in its area. The wireless communication devices may register with a particular access point 106 to receive services from the communication system (e.g., via a SU-MIMO or MU-MIMO configuration). For direct connections (i.e., point-to-point communications), some wireless communication devices may communicate directly via an allocated channel and communications protocol. Some of the wireless communication devices 102 may be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 may sometimes be referred to as a wireless access point (WAP). An access point 106 may be configured, designed and/or built for operating in a wireless local area network (WLAN). An access point 106 may connect to a router (e.g., via a wired network) as a stand-alone device in some embodiments. In other embodiments, an access point 106 can be a component of a router. An access point 106 can provide multiple devices access to a network. An access point 106 may, for example, connect to a wired Ethernet connection and provides wireless connections using radio frequency links for other devices 102 to utilize that wired connection. An access point 106 may be built and/or configured to support a standard for sending and receiving data using one or more radio frequencies. Those standards, and the frequencies they use may be defined by the IEEE (e.g., IEEE 802.11 standards). An access point 106 may be configured and/or used to support public Internet hotspots, and/or on an internal network to extend the network's Wi-Fi signal range.

In some embodiments, the access points 106 may be used for in-home or in-building wireless networks (e.g., IEEE 802.11, Bluetooth, ZigBee, any other type of radio frequency based network protocol and/or variations thereof). Each of the wireless communication devices 102 may include a built-in radio and/or is coupled to a radio. Such wireless communication devices 102 and/or access points 106 may operate in accordance with the various aspects of the disclosure as presented herein to enhance performance, reduce costs and/or size, and/or enhance broadband applications. Each wireless communication devices 102 may have the capacity to function as a client node seeking access to resources (e.g., data, and connection to networked nodes such as servers) via one or more access points.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 1B:
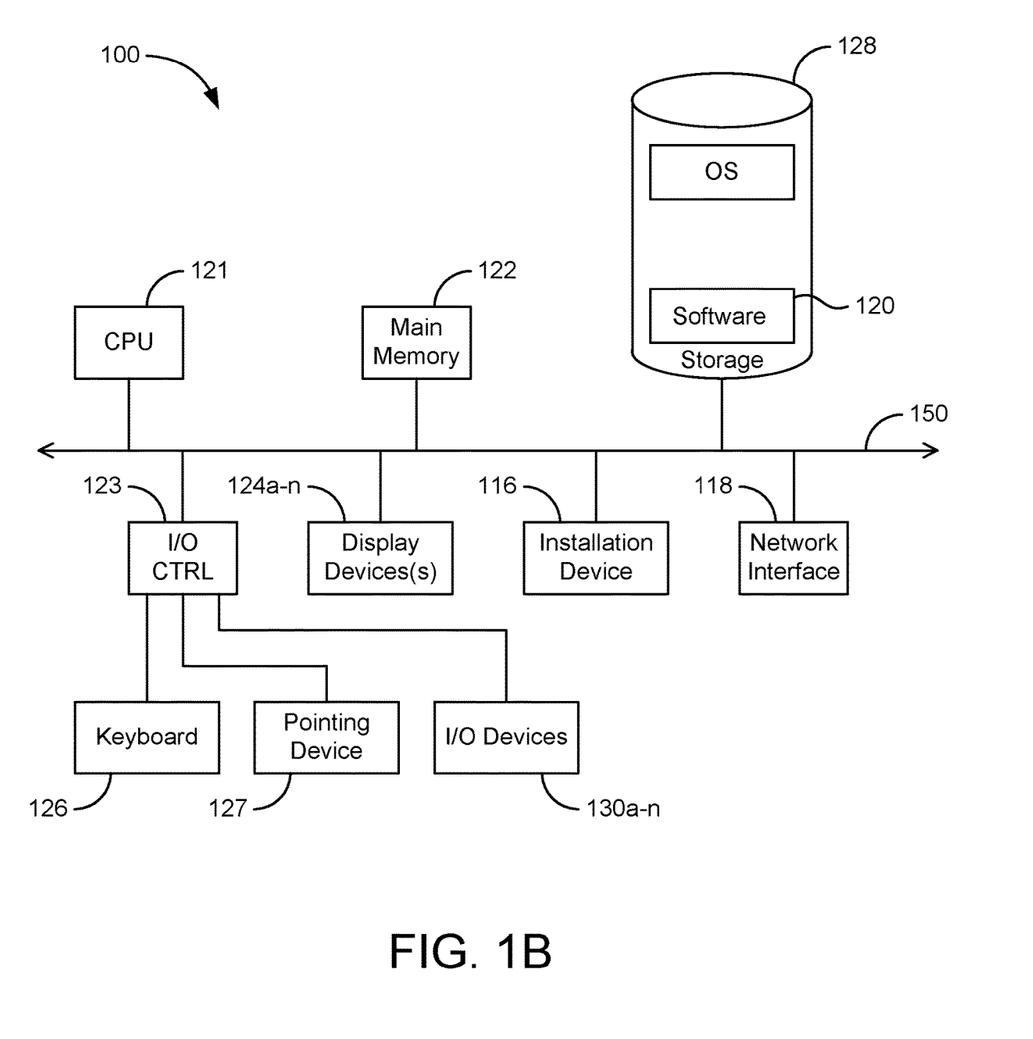
FIGS. 1B and 1C are block diagrams depicting embodiments of computing devices useful in connection with the methods and systems described herein.
Figure 1C:
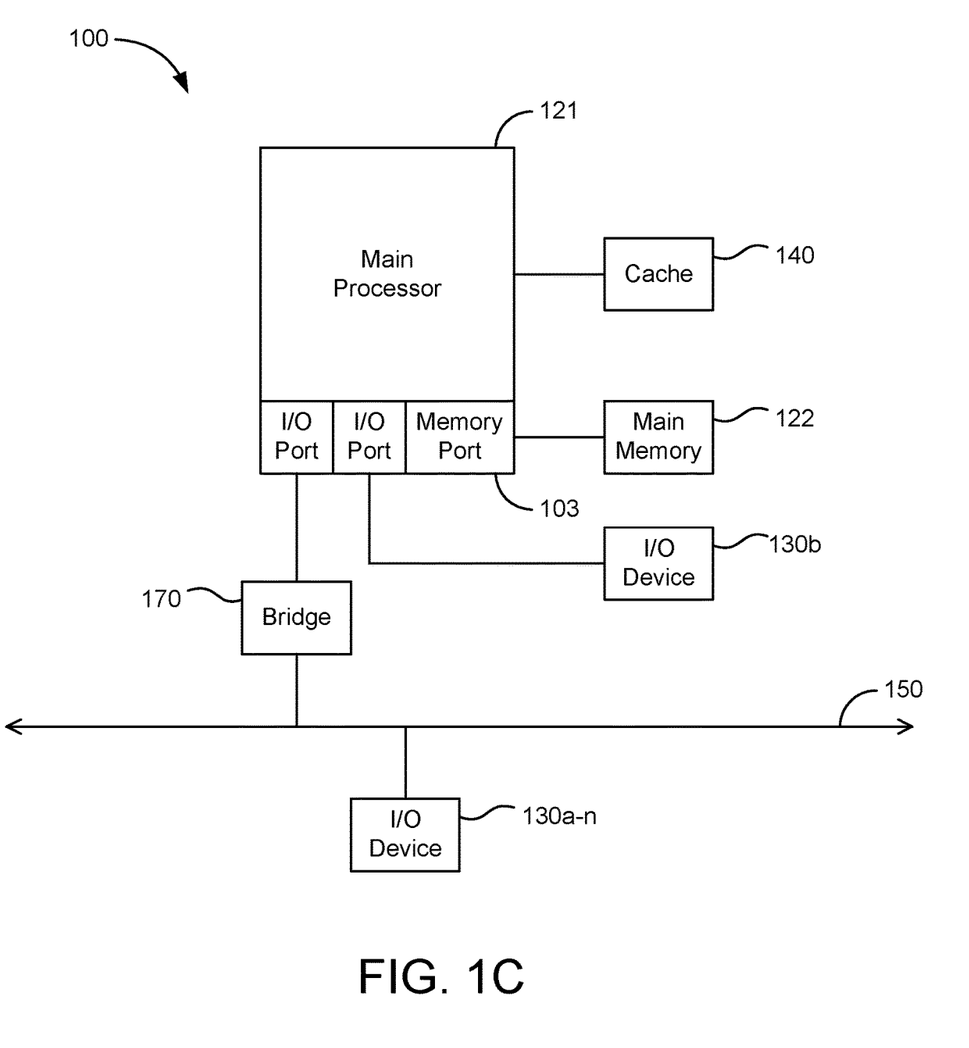

The communications device(s) 102 and access point(s) 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication device 102 or access point 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 100 may be based on any of these processors, or any other processor capable of operating as described herein.

Main memory unit 122 may be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM or DRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 has a faster response time than main memory 122 and is provided by, for example, SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer or computer system 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, California.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 may further include a storage device, such as one or more hard disk drives or redundant arrays of independent disks, for storing an operating system and other related software, and for storing application software programs such as any program or software 120 for implementing (e.g., software 120 configured and/or designed for) the systems and methods described herein. Optionally, any of the installation devices 116 could also be used as the storage device. Additionally, the operating system and the software can be run from a bootable medium.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may include or be connected to one or more display devices 124a-124n. As such, any of the I/O devices 130a-130n and/or the I/O controller 123 may include any type and/or form of suitable hardware, software, or combination of hardware and software to support, enable or provide for the connection and use of the display device(s) 124a-124n by the computing device 100. For example, the computing device 100 may include any type and/or form of video adapter, video card, driver, and/or library to interface, communicate, connect or otherwise use the display device(s) 124a-124n. In one embodiment, a video adapter may include multiple connectors to interface to the display device(s) 124a-124n. In other embodiments, the computing device 100 may include multiple video adapters, with each video adapter connected to the display device(s) 124a-124n. In some embodiments, any portion of the operating system of the computing device 100 may be configured for using multiple displays 124a-124n. One ordinarily skilled in the art will recognize and appreciate the various ways and embodiments that a computing device 100 may be configured to have one or more display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device or system 100 of the sort depicted in FIGS. 1B and 1C may operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein. Aspects of the operating environments and components described above will become apparent in the context of the systems and methods disclosed herein.

B. Systems and Methods of Storing Context in a SAN

Figure 2:
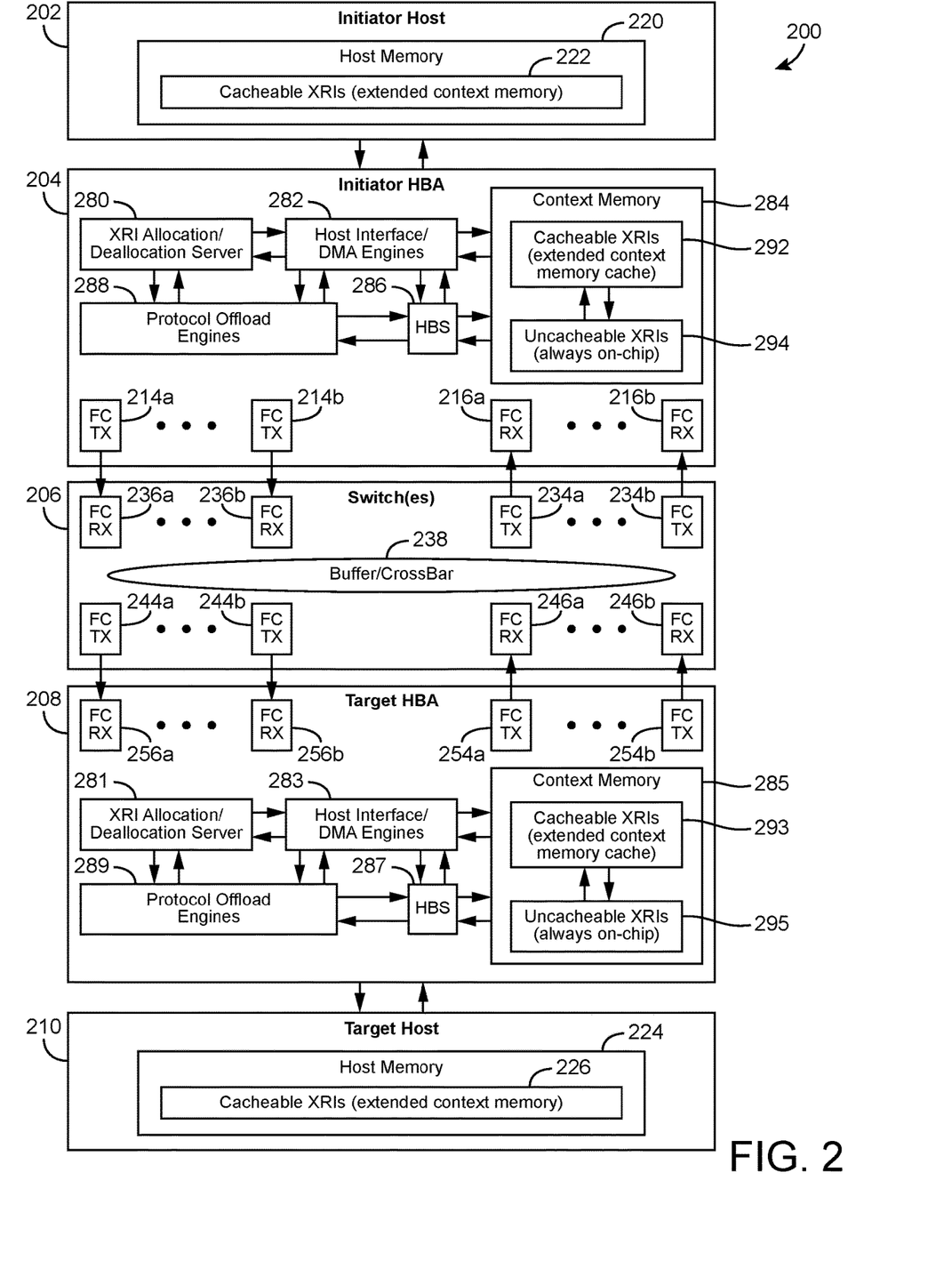
FIG. 2 is a block diagram of a network configured to use storage techniques according to some embodiments.

With reference to FIG. 2, a network 200 includes an initiator host 202, an initiator host bus adaptor (HBA) 204, switched network 206, a target HBA 208, and a target host 210. The network 200 is arranged as an FC SAN in some embodiments. The network 200 can utilize link-level flow control and host CPU/software/drivers to limit the number of commands outstanding or to control the queue depth in some embodiments. In addition, host CPU/software/driver is configured to coordinate traffic between connections without affecting performance due to limits on CPU overhead in some embodiments.

The network 200 can be utilized with the computing and communication components described above with respect to FIGS. 1A-C. For example, computer system 100 or communication devices 102 can be a target host 210 or initiator host 202. The network 200 is a high-speed network that connects initiator host 202 to target host 210 (e.g., a high-performance storage subsystem). The network 200 can access storage processors (SPs), and storage disk arrays (e.g., target host 210) in some embodiments. The network 200 can use FC protocol to package SCSI commands into FC frames in some embodiments. When transferring data between the initiator host 202 and the target host 210, network 200 can utilize multi-pathing to provide more than one physical path from the initiator host 202 and the target host 210 via the switched network 206.

Initiator host 202 includes a host memory 220. Host memory 220 is volatile or non-volatile memory. Host memory 220 includes one or more memory chips capable of storing data, such as any type or variant of static random access memory (SRAM), dynamic random access memory (DRAM), ferroelectric RAM (FRAM), NAND Flash, NOR Flash and Solid State Drives (SSD) or combinations thereof. Host memory 220 may be based on any of the above described memory chips, or any other available memory chips capable of operating as described herein. Host memory 220 can include or operate with a disk drive, a CD-ROM drive, a CD-R/RW drive, a DVD-ROM drive, a flash memory drive, tape drives of various formats, USB device, hard-drive, a network interface, or any other device suitable for data storage. In some embodiments, the host memory 220 includes an extended context memory 222 for extensible resource identifier or exchange resource indicator (XRI) storage. The XRIs provide a uniform syntax for abstract structured identifiers. The extended context memory 222 is cacheable in some embodiments. Target host 210 can include similar components.

Target host 210 includes a target memory 224. Target memory 224 is volatile or non-volatile memory. Target memory 224 includes one or more memory chips capable of storing data, such as any type or variant of static random access memory (SRAM), dynamic random access memory (DRAM), ferroelectric RAM (FRAM), NAND Flash, NOR Flash and Solid State Drives (SSD) or combinations thereof. Target memory 224 may be based on any of the above described memory chips, or any other available memory chips capable of operating as described herein. Target memory 224 can include or operate with a disk drive, a CD-ROM drive, a CD-R/RW R/RW drive, a DVD-ROM drive, a flash memory drive, tape drives of various formats, USB device, hard-drive, a network interface, or any other device suitable for data storage. In some embodiments, the target memory 224 includes an extended context memory 226 for extensible resource identifier or exchange resource indicator (XRI) storage. The XRIs provide a uniform syntax for abstract structured identifiers. The extended context memory 226 is cacheable in some embodiments.

The initiator HBA 204 and target HBA 208 are line cards, mezzanine cards, motherboard devices, or other devices and are configured according to SCSI, FC and serial AT attachment (SATA) protocols in some embodiments. Initiator HBA 204 includes transmitter ports 214a-b and receiver ports 216a-b. Ports 214a-b and ports 216a-b can be any number for 1 to N. Target HBA 208 includes transmitter ports 254a-b and receiver ports 256a-b. Ports 254a-b and ports 256a-b can be any number for 1 to N. In some embodiments, initiator HBA 204 and target HBA 208 are FC HBAs implemented as an ASIC as a multi-function PCI-Express Gen 4 device, with connectivity at 4×64 gigabyte fibre channel (GFC) full line-rate. The ASIC can provide a host backing store (HBS) with service level interface (SLI) versions and protocol offloads for a fibre connection (FI-CON) command mode and fibre channel protocol (FCP) (e.g., SCSI, non-volatile memory express (NVMe) and FICON).

HBA 204 includes an XRI allocation/deallocation server 280, a host interface/direct memory access (DMA) engine unit 282, a context memory 284, a host backing store (HBS) unit 286 and protocol offload engines 288. Target HBA 208 can include similar components. HBA 208 includes an XRI allocation/deallocation server 281, a host interface/direct memory access (DMA) engine unit 283, a context memory 285, a host backing store (HBS) unit 287 and protocol offload engines 289.

Context memory 284 includes a memory cache or storage 292 for cacheable XRIs and is configured as an extended context memory cache. Context memory 284 also include on-chip storage 294 for uncacheable XRIs. In some embodiments, the context memory 284 can include one or more memory chips capable of storing data and allowing any storage location, such as any type or variant of static random access memory (SRAM), dynamic random access memory (DRAM), ferroelectric RAM (FRAM), NAND Flash, NOR Flash and solid state drives (SSD) or combinations thereof. Context memory 285 includes a memory cache or storage 293 for cacheable XRI's and is configured as an extended context memory cache. Context memory 285 also include on-chip storage 295 for uncacheable XRIs. In some embodiments, the context memory 285 can include one or more memory chips capable of storing data and allowing any storage location, such as any type or variant of static random access memory (SRAM), dynamic random access memory (DRAM), ferroelectric RAM (FRAM), NAND Flash, NOR Flash and solid state drives (SSD) or combinations thereof.

The XRI allocation and deallocation (XAD) server 280 on HBA 204 is an on-chip unit in some embodiments. The XAD server 280 allocates cacheable and uncacheable XRI's based upon range (e.g., address range) in some embodiments. In some embodiments, the XAD server 280 optimizes performance of a tier 1 pool first using storage 294 and performance of a tier 2 pool second using storage 292 or extended context memory 222. The XAD server 280 can be implemented using software executed on a processor or be logic based. The XRI allocation and deallocation (XAD) server 281 of HBA 208 is similar to server 280.

The host interface/direct memory access (DMA) engine unit 282 provides an interface for direct memory accessing of host memory 220. The host interface/direct memory access (DMA) engine unit 282 can communicate context data as well as payloads and can include a queue prefetch engine, a PCI interface engine, a payload DMA engine, and a control DMA engine in some embodiments. The host interface/direct memory access (DMA) engine unit 282 can be implemented using software executed on a processor or be logic based. The host interface/direct memory access (DMA) engine unit 283 of HBA 208 is similar to unit 282.

The HBS unit 286 is a cache memory controller extension. HBS unit 286 reviews VCA to determine ranges for access of storage 292 and 294 based upon VCA ranges (e.g., under 4000 uses storage 294 and equal to or above 4000 uses storage 292). The host backing store (HBS) unit 286 can be implemented using software executed on a processor or be logic based. The HBS unit 287 of HBA 208 is similar to unit 286.

The protocol offload engines 288 offload exchanges. The protocol offload engines 288 can fetch contexts, and update and maintain contexts for completing the I/O exchange. In some embodiments, the protocol offload engines 288 seamlessly handles phases of exchanges including the completion of message phase. The protocol offload engines 288 can be implemented using software executed on a processor or be logic based. The protocol offload engines 289 of HBA 208 is similar to protocol offload engines 288.

The switched network 206 includes receive ports 236a-b, transmit ports 234a-b, transmit ports 244a-b, receive ports 246a-b, and a buffer or crossbar switch 238. Ports 234a-b, ports 244a-b, ports 236a-b and ports 246a-b can be any number for 1 to N. Ports 236a-b are in communication with ports 214a-b, and ports 234a-b are in communication with ports 216a-b. Ports 236a-b are in communication with ports 244a-b via crossbar switch 238, and ports 234a-b are in communication with ports 246a-b via the crossbar switch 238. Ports 244a-b are in communication with ports 256a-b, and ports 246a-b are in communication with ports 254a-b. The switched network 206 is a fabric switched network, arbitrated loop network, or point-to-point network in some embodiments. Ports 236a-b, 234a-b, 244a-b, and 246a-b can be associated with servers, hubs, switches, routers, directors, nodes or other devices. The switched network 206 can include the physical layer, interconnect devices, and translation devices.

The buffer or crossbar switch 238 can be two unidirectional switches or a bidirectional switches configured to interconnect ports 236a-b with ports 244a-b and ports 234a-b with ports 246a-b. The crossbar switch 238 can include a matrix of switches and include buffers and other communication and interface circuitry. Each of ports 214a-b, 216a-b, 234a-b, 236a-b, 244a-b, 246a-b, 254a-b, and 256a-b can have a unique addressable identifier. Each of ports 214a-b, 216a-b, 234a-b, 236a-b, 244a-b, 246a-b, 254a-b, and 256a-b can be associated with a network node and a pair of ports 214a-b, 216a-b, 234a-b, 236a-b, 244a-b, 246a-b, 254a-b, and 256a-b can be associated with a network link.

In some embodiments, HBA 204 and initiator host 202 are configured to extend the on-chip memory usage into host memory 220 without increasing the size of on-chip memory (e.g. context memory 284). HBA 204 and initiator host 202 are configured to provide multi-tier memory structures for multi-tier exchange offloads. The tier one pool provides a number of uncacheable exchange contexts that are always stored on-chip in storage 294, which is optimized for performance with low latency operations in some embodiments. The tier two pool provides a number of cacheable exchange contexts that can be on-chip in storage 292 or in host memory 220 for scalability. In addition, a number of contexts may be pinned on-chip to eliminate or reduce cache misses during I/O operations. The tier selection can be accomplished manually or automatically.

In some embodiments, a host driver or an internal adapter agent of HBA 204 may request XRI resources in the tier one pool or tier two pool explicitly based on classification of traffic types, I/O sizes, etc. As an optimization according to some embodiments, the selection can be performed automatically to provision a tier one pool to link to a tier two pool, which allows the tier two pool resources to be allocated when the tier one pool resources are exhausted. Therefore, the requesting agent does not have to make two XRI allocation requests if the tier one pool is empty in some embodiments. A self-identifying mechanism with XRI ranges is carried out to direct XRI releases to the appropriate tier one or tier two pool automatically in some embodiments.

In some embodiments, the system and method offloads I/O exchanges with multi-tier exchange contexts in memory 284 and host memory 220 for optimized performance and scalability. The on-chip memory 284 can be extended into host memory 220 virtually without increasing the size of on-chip memory 284 in some embodiments. The host memory 220 and context memory 284 provide a multi-tier memory system that offers performance and scalability, which can be selected manually or automatically in some embodiments.

A number of tier two cacheable contexts may be pinned on-chip to eliminate or reduce cache misses during I/O operations using HBA 204. Several programmable cache line pin methods are provided for optimizing performance with programmable limits per set index, type and/or port and can be performed by HBS unit 286. Once a cache line is pinned, the cache line cannot be replaced until it is unpinned. At the end of each I/O operation, the associated I/O exchange cache lines are unpinned in order to release cache line resources. According to some embodiments, pin methods that can be enabled or disabled independently include:

1. I/O Phase pin—a pin operation may be requested for a particular I/O phase such as non-end-of-sequence frames.
2. First-Inline pin—a pin operation may be requested based on a first-come first-served basis, provided the pin limit has not been reached. For the set associative caching scheme, there is a programmable pin count per set index (e.g., Program N-way/2 as the PIN count set index limit), which is the number of cache lines that can be pinned per set index on-chip.
3. Region pin—a pin operation may be requested if the address of a request is within certain programmable virtual context address (VCA) ranges. A programmable pin count is provided to limit the number of cache lines that can be pinned per pin region.
4. I/O size range pin—a pin operation may be requested if the I/O size of a request is within certain programmable pin I/O size ranges.
5. XRI range pin—a pin operation may be requested if the XRI number of a request is within certain programmable XRI ranges.
6. Protocol pin—a pin operation may be requested based on FC-4 protocol such as NVMe or SCSI.
7. Work queue (WQ) pin dictated by WQ profile configuration.
8. Work queue entry (WQE) contains a pin bit directed by the host driver.

Pin operations are opportunistic in nature. Once a pin limit has been reached, subsequent accesses will be cached without being pinned. The I/O Phase pin can include a command phase, a transfer ready phase, a data phase (first sequence, etc.), and of sequence phase.

XAD server 280 provides a hardware offload of allocating shared pools of XRI numbers to improve host driver performance by reducing or eliminating CPU contentions. In some embodiments, the XAD server 280 allows any CPUs to allocate or deallocate XRI numbers without creating a semaphore or spinlock in some embodiments. Creating spinlocks or coordinating between CPUs for XRI allocation/sharing can severely impact performance. Each XRI pool can be pre-loaded with a list of valid XRI numbers during initialization. A simple register access (e.g., via doorbells) at a single offset in a peripheral component interconnect express (PCIe) function base address register (BAR) initiates an XRI allocation or deallocation process by XAD server 280 in some embodiments. In some embodiments, internal adapter agents may access XRI pools for allocating and deallocating XRI resources as needed.

The XRI number allocation order can be configured in LIFO (Last in First Out) mode or FIFO (First In First Out) mode for each tier independently. The LIFO mode XRI configuration enhances tier two caching performance by allocating or reusing recently retired XRI exchange contexts to increase cache line hit rate. An example configuration is to program tier one pool in FIFO mode to facilitate debug and to program tier two pool in LIFO mode to improve caching performance.

HBS unit 286 provides accesses to extended data storage for exchange related contexts backed by host memory 220. The HBS unit 286 supports Page Address Translation (PAT) that converts virtual context memory addresses (VCAs) to PCIe host physical addresses to facilitate the expansion of address space in some embodiments. The HBS unit 286 provides caching of exchange related contexts on-chip in some embodiments. HBS unit 286 maintains a number of cache lines in on-chip memory 284 to provide quick access by HBS clients. The actual cache line data is stored in context memory 284.

The HBS unit 286 maintains a number of cache lines in context memory 284 to provide quick access by HBS clients on-chip. The actual cache line data is the stored in on-chip context memory 284. One or more cache controllers can be provided in the HBS unit 286, each managing a different set of contexts or data structures. Several context or data structure types with programmable strides may be packed into a single cache line to increase the cache hit rate for accesses performed by various modules chronologically.

On a cache miss, the HBS unit 286 evicts one of the cache lines stored in memory 284 and writes it back to host memory 220 (if no free entry is available) and fetches a new cache line to fill the cache on-chip (e.g., storage 292). Two cache replacement policies are supported, which are least recently used (LRU/Pseudo LRU) and random cache eviction policies. The cache subsystem provides optional protection for cache lines stored in host memory 220 with cyclical redundancy checks (CRCs). Each context entry will be protected by an embedded CRC in some embodiments, the cache of the HBS unit 286 is separate from clients' L1 caches of the HBS unit 286 maintained in client modules for high performance ultra-low latency accesses to contexts or data structures.

In some embodiments, exchange data stored in host memory 220 belongs to a PCIe function and data of a particular PCIe must not reside in memory for another PCIe function. Page address translation (PAT) entries must be programmed with appropriate host memory page addresses and PCIe function ID.

In some embodiments, HBA 208 and target host 210 are configured to extend the on-chip memory usage into target memory 224 without increasing the size of on-chip memory (e.g. context memory 285). HBA 208 and target host 210 are configured to provide multi-tier memory structures for multi-tier exchange offloads. The tier one pool provides a number of uncacheable exchange contexts that are always stored on-chip in storage 295, which is optimized for performance with low latency operations in some embodiments. The tier two pool provides a number of cacheable exchange contexts that can be on-chip in storage 293 or in target memory 224 for scalability. In addition, a number of contexts may be pinned on-chip to eliminate or reduce cache misses during I/O operations. The tier selection can be accomplished manually or automatically.

In some embodiments, a host driver or an internal adapter agent of HBA 208 may request XRI resources in the tier one pool or tier two pool explicitly based on classification of traffic types, I/O sizes, etc. As an optimization according to some embodiments, the selection can be performed automatically to provision a tier one pool to link to a tier two pool, which allows the tier two pool resources to be allocated when the tier one pool resources are exhausted. Therefore, the requesting agent does not have to make two XRI allocation requests if the tier one pool is empty in some embodiments. A self-identifying mechanism with XRI ranges is carried out to direct XRI releases to the appropriate tier one or tier two pool automatically in some embodiments.

In some embodiments, the system and method offloads I/O exchanges with multi-tier exchange contexts in memory 285 and target memory 224 for optimized performance and scalability. The on-chip memory 285 can be extended into target memory 224 virtually without increasing the size of on-chip memory 285 in some embodiments. The target memory 224 and context memory 285 provide a multi-tier memory system that offers performance and scalability, which can be selected manually or automatically in some embodiments.

A number of tier two cacheable contexts may be pinned on-chip to eliminate or reduce cache misses during I/O operations using HBA 208. Several programmable cache line pin methods are provided for optimizing performance with programmable limits per set index, type and/or port and can be performed by HBS unit 287. Once a cache line is pinned, the cache line cannot be replaced until it is unpinned. At the end of each I/O operation, the associated I/O exchange cache lines are unpinned in order to release cache line resources. According to some embodiments, pin methods that can be enabled or disabled independently include:

1. I/O Phase pin—a pin operation may be requested for a particular I/O phase such as non-end-of-sequence frames.
2. First-Inline pin—a pin operation may be requested based on a first-come first-served basis, provided the pin limit has not been reached. For the set associative caching scheme, there is a programmable pin count per set index (e.g., Program N-way/2 as the PIN count set index limit), which is the number of cache lines that can be pinned per set index on-chip.
3. Region pin—a pin operation may be requested if the address of a request is within certain programmable virtual context address (VCA) ranges. A programmable pin count is provided to limit the number of cache lines that can be pinned per pin region.
4. I/O size range pin—a pin operation may be requested if the I/O size of a request is within certain programmable pin I/O size ranges.
5. XRI range pin—a pin operation may be requested if the XRI number of a request is within certain programmable XRI ranges.
6. Protocol pin—a pin operation may be requested based on FC-4 protocol such as NVMe or SCSI.
7. Work queue (WQ) pin dictated by WQ profile configuration.
8. Work queue entry (WQE) contains a pin bit directed by the host driver.

Pin operations are opportunistic in nature. Once a pin limit has been reached, subsequent accesses will be cached without being pinned. The I/O Phase pin can include a command phase, a transfer ready phase, a data phase (first sequence, etc.), and of sequence phase.

XAD server 281 provides a hardware offload of allocating shared pools of XRI numbers to improve host driver performance by reducing or eliminating CPU contentions. In some embodiments, the XAD server 281 allows any CPUs to allocate or deallocate XRI numbers without creating a semaphore or spinlock in some embodiments. Creating spinlocks or coordinating between CPUs for XRI allocation/sharing can severely impact performance. Each XRI pool can be pre-loaded with a list of valid XRI numbers during initialization. A simple register access (e.g., via doorbells) at a single offset in a peripheral component interconnect express (PCIe) function base address register (BAR) initiates an XRI allocation or deallocation process by XAD server 281 in some embodiments. In some embodiments, internal adapter agents may access XRI pools for allocating and deallocating XRI resources as needed.

The XRI number allocation order can be configured in LIFO (Last in First Out) mode or FIFO (First In First Out) mode for each tier independently. The LIFO mode XRI configuration enhances tier two caching performance by allocating or reusing recently retired XRI exchange contexts to increase cache line hit rate. An example configuration is to program tier one pool in FIFO mode to facilitate debug and to program tier two pool in LIFO mode to improve caching performance.

HBS unit 287 provides accesses to extended data storage for exchange related contexts backed by target memory 224. The HBS unit 287 supports Page Address Translation (PAT) that converts virtual context memory addresses (VCAs) to PCIe host physical addresses to facilitate the expansion of address space in some embodiments. The HBS unit 287 provides caching of exchange related contexts on-chip in some embodiments. HBS unit 287 maintains a number of cache lines in on-chip memory to provide quick access by HBS clients. The actual cache line data is stored in context memory 285.

The HBS unit 287 maintains a number of cache lines in context memory 285 to provide quick access by HBS clients on-chip. The actual cache line data is the stored in on-chip context memory 285. One or more cache controllers can be provided in the HBS unit 287, each managing a different set of contexts or data structures. Several context or data structure types with programmable strides may be packed into a single cache line to increase the cache hit rate for accesses performed by various modules chronologically.

On a cache miss, the HBS unit 287 evicts one of the cache lines stored in memory 285 and writes it back to target memory 224 (if no free entry is available) and fetches a new cache line to fill the cache on-chip (e.g., storage 293). Two cache replacement policies are supported, which are least recently used (LRU/Pseudo LRU) and Random cache eviction policies. The cache subsystem provides optional protection for cache lines stored in target memory 224 with cyclical redundancy checks (CRCs). Each context entry will be protected by an embedded CRC in some embodiments, the cache of the HBS unit 287 is separate from clients' L1 caches of the HBS unit 287 maintained in client modules for high performance ultra-low latency accesses to contexts or data structures.

In some embodiments, exchange data stored in target memory 224 belongs to a PCIe function and data of a particular PCIe must not reside in memory for another PCIe function. Page address translation (PAT) entries must be programmed with appropriate host memory page addresses and PCIe function ID in some embodiments.

HBS hints are provided by ingress clients to preload cache entries before commands/frames arrive at the protocol engines offload. To alleviate cache miss penalties, retry operations are provided by the HBS unit 286 or 287 to allow HBS clients to park cache missed requests and move on to another command/context without blocking. With retry enabled, upon a read cache miss, the HBS unit 286 or 287 eturns a miss response to the requesting HBS client and initiates a context fetch DMA via host interface/DMA engine unit 282 or 283 to obtain the host backing data in on-chip cache before next retry.

A programmable uncacheable region is provided that bypasses HBS cache lookup to provide low latency memory accesses for uncacheable contexts in some embodiments. In addition, HBS clients provide separate programmable cacheable and uncacheable context base addresses to facilitate simultaneous non-blocking multi-tier memory operations between cacheable and uncacheable requests in some embodiments.

Although some exemplary embodiments are described and illustrated herein in terms of FC HBAs or storage adapters, it should be understood that embodiments of this disclosure are not so limited, but may additionally be applied in the context of many other adapters with congestion managements such as ethernet converged network adapters (CNA) or security adapters. Even though two tier pools are described, three or more tiers may be incorporated to provide fine grain differentiation for various traffic types as necessary according to some embodiments.

Figure 3:
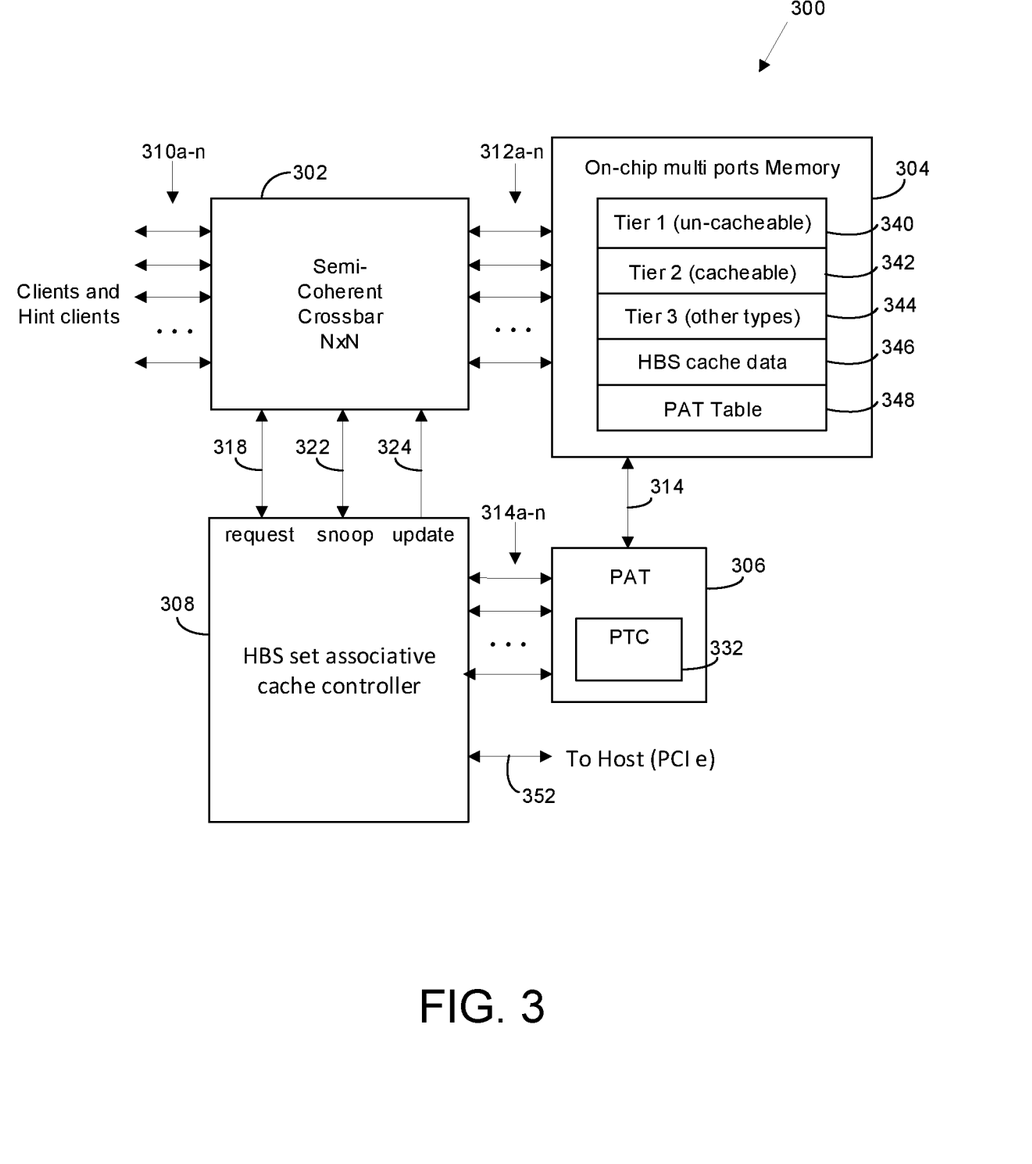
FIG. 3 is a block diagram of host backing store unit and a context memory for a network similar to the network illustrated in FIG. 3 according to some embodiments.

With reference to FIG. 3, a system 300 can support a large number of I/O context structures using multi-tier memory storage approach. System 300 can be employed in a network HBA with a host backing storage (HBS) with on-chip caching similar to network 200 (FIG. 2). System 300 is employed in a FC HBA, an Ethernet HBA, or a mix of heterogeneous clients (FC and Ethernet or other) in the same adaptor. In some embodiments, system 300 can be a large HBA Level 2 cache for an on-chip Level 1 cache.

In some embodiments, system 300 provides a dynamic structure allocation with a seamless memory tier selection with traffic optimization to avoid blocking between tiers. In some embodiments, the system 300 optimizes the cacheable traffic to allow servicing clients out of order whenever possible. In some embodiments, the system 300 maximizes parallel operations of the client to the data, provides a parallel client coherency scheme and is able to scale up the resources easily. In some embodiments, the system 300 seamlessly allocates a structure in the cache VCA space and performs at low power consumption (e.g., a low power sub 10 Watt envelope for HBAs).

System 300 includes a memory 304, a crossbar 302, a cache controller 308, and a page address translation (PAT) sub-unit 306. PAT sub-unit 306 includes a page translation cache (PTC) cache 332 for PAT table data. Memory 304 includes tier 1 storage 340, storage 342 for tier 2 storage (HBS cacheable data 346 or remapped data), tier 3 storage 344, HBS cacheable data storage 346 for tier 2 and/or tier 3 cached data, and PAT table storage 348. In some embodiments, crossbar 302, cache controller 308, and PAT sub-unit 306 are part of a Host (PCIe Root complex) back memory storage unit (e.g., similar to HBS unit 286 (FIG. 2)) configured to manage the context memory 304 (e.g., as a cache/memory controller). The host backing memory is accessible via link 352 and can be replaced by any other memory (e.g. memory attached to a PCIe Upstream switch or located on a different PCIe bus).

Tier 1 storage 340 stores uncacheable data, and tier 2 storage 342 stores HBS cacheable data or remapped data. The tier 3 storage 344 stores other data types. In some embodiments, the other data types can include tier 3 data, XRI data, or context structure data. HBS cacheable data storage 346 stores data for the tier 2 and/or tier 3 cached data, and PAT table storage 348 stores PAT table data. PAT table 348 is a host PAT table in some embodiments.

Memory 304 is an on-chip memory with multi ports 312a-n. The memory 304 is similar to context memory 284 (FIG. 2) in some embodiments. The number of ports is from 2 to N, where N is an integer. Each of ports 312a-n can correspond to a respective client of n number of clients in some embodiments. Memory 304 includes a port coupled to PAT sub-unit 306 by a link 314. Memory 304 can be any of the storage types discussed above.

Memory 304 is shared between non-cacheable storage 340, the cache data storage 342 and 344, HBS cache data storage 346 and the PAT table 348. The memory 304 exposes the same data to each of the multi ports 312a-n. The client to client request ordering is not enforced by the cache but it is part of the client to client protocol in some embodiments. Storage 342 stores cacheable remapped data not backed by the host memory 304 and for which the tier 2 VCA address is remapped into the context memory 304. The remap status is part of the PTA table 348. The remapping feature allows faster access time similar the uncacheable data but within the cacheable space and so transparent to the client in some embodiments.

Crossbar 302 is a semi-coherent crossbar structure in some embodiments. Crossbar 302 is used to connect a client port 310a-n to one of the ports 312a-n. The crossbar 302 does not need to support crossing port (e.g., N to N+M) and can provide direct N to N connectivity. The crossbar 302 on the side connected to the clients at ports contains logic to decode the VCA address and separates the addresses into independent non-blocking data paths in some embodiments. The crossbar 302 contains logic to support cache snooping for multi cache lines at once every clock. The snoop request is provided via a link 322 from the cache controller 308 in some embodiments. The crossbar snoop interface associated with link 322 allows cache line ownership checking between each client and the cache controller 308. The crossbar input client logic of the crossbar 302 also supports out of order fill and flush signals. The output side of the crossbar 302 is connected to each of ports 312a-n and supports three data paths including uncacheable, cacheable hit or miss lines. The crossbar 302 provides three independent (n×3) data paths and provides an optimal solution to non-blocking, out of order, low latency and high bandwidth in some embodiments.

The crossbar client queue logic of crossbar 302 supports cache line parking for cacheable data. A client queue keeps a used VCA address information after the client is done with it. The client may hit a valid parked cache line and directly access the cache data if present further reducing the cache extra overhead to 0. The cache controller 308 provides side band controls to client (e.g. evict, flush, invalidate, etc.) to take advantage of the time and space locality specific to the cached structure in some embodiments.

The cache controller 308 uses a serial pipeline where a new request may enter it every clock. The four stages of the pipeline (arbitration, lookup read, lookup decode, controller) may be stopped by the cache controller 308 if the last stage becomes full. The cache controller 308 processes a cacheable request every clock in some embodiments.

Given the low latency, a large number of cache lines and very low memory power, a set (way) associative write back cache structure with least recently used (LRU) or random way selection is used. The number of way supported per cache index is 16 or more in some embodiments. One LRU status is available for each cache index. Per cache index LRU allows very low placement granularity and cache hit improvement in some embodiments.

In some embodiments, the cache controller 308 supports three cache line states: Invalid, Valid (clean) and Modified. The cache controller 308 supports different cache data size (4 MB to 512 KB), 16 or 8 ways selection and several VCA to cache index mapping functions. The several mapping functions are available to reduce cache trashing by switching function in some embodiments. Cache memory power consumption reduction is possible by switching off the unused cache set memory in some embodiments.

The cache controller 308 supports several features for non-blocking using internal and external retry and independent data path for processing Hit and Miss cache line. The cache controller 308 supports cache line locking through directed (by clients) or autonomous pinning or unpinning cacheable structures that belong to the same cache line. This allows faster and more predictable client access to critical data in some embodiments. The cache controller 308 also support several hinting ports without on-chip memory access. The hinting ports are use by clients with advance time knowledge for an incoming VCA request. The hinting allows the cache controller 308 to early fetch a cacheable VCA data. The cache controller 308 moves HBS data in bulk of cache line size (e.g., 256 Bytes) over a PCIe link using on-chip DMA engines (e.g., unit 282 (FIG. 2)) in some embodiments. The cache controller 308 provides 1 to N management clients. Management clients is controlled by on-chip firmware. Applications for multiple management clients can include per function group support or management processing acceleration.

The cache controller 308 supports I/O virtualization. Each I/O external port traffic may have one or multiple PCI functions allocated. Virtual PCI functions can be associated with a physical function. In some embodiments, physical functions traffic and host memory location are controlled by host IO MMU and are dependent. PCI functions can be enabled or disabled at any time, and the host memory data location may change over time based on the PCI function status. A flexible and programmable host address mapping into the cache VCA space is necessary with a minimum of 4 KB page. The translation access must also be very low latency and provide concurrent access to the PAT table 348. Because one translation may contains multiple structures in the same page size of 4 KB, an address translation will have a time and space locality exploitable by a translation cache. Due to the exposure of the off-chip memory to possible corruption (e.g., rogue function, hacker, etc.), early HBS structure corruption detection is provided in some embodiments.

Tier 2 data cacheable and not remapped is backed by the host memory and is partitioned for each PCI function. In some embodiments, PCI function X will not share a VCA space with function Y. The initial function portioning is stored in each PAT entry in the PAT table 348 at the creation of the entry. The function ID is stored in each cache way and used through the cache controller 308 where it is necessary (Host DMA, PCIe etc.). The cache controller 308 supports cacheable VCA lookup but also function ID lookup for cache management in some embodiments. The cache does not differentiate between physical and virtual functions in some embodiments.

The PAT page structure reduces the number of table entries and keeps the PAT table 348 on-chip in some embodiments. Because of the page structure of the PAT mapping of VCA, a same PAT entry is used for multiple groups of 256 bytes structures (up to 16 with 4 KB page size). This allows caching of the PAT entry with the expectation for some space or time locally. PAT sub-unit 306 includes cache 332 similar to cache 308. A similar 16 way set associative is used without the write back feature in some embodiments.

Associated with PCI function virtualization, there are issues related to the HBS memory data protection. An early protection mechanism is added in the structure of a cache line data stored in the host in some embodiments. A two byte CRC is stored and checked by the HBA for every cache line in some embodiments. The HBA computes the cache line CRC when it DMA the data into the host memory in some embodiments. The HBA checks the cache line CRC when it DMA reads the cache line from the host memory in some embodiments.

Client's structures can be allocated to different memory tiers based on their criticality as opposed to all allocated in one same tier. The client has control over the structure persistence in the cache and may keep or pin, flush, invalidate, evict or re-use as opposed to keep from start to end in some embodiments. The system 300 allows up to 262144 complex structures (256K×CCBs) in some embodiments. In some embodiments, system 300 reduces on-chip RAM memory and/or reallocates the om-chip RAM memory to other resources.

It should be noted that certain passages of this disclosure may reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of communicating in a storage network, wherein data is communicated using exchange resource indicators, the method comprising:
   receiving a request for an exchange resource indicator at an adapter for the storage network, the adapter being an electronic device and comprising an electronic context memory comprising a first storage and a second cache;
   providing the exchange resource indicator from the first storage in the adapter if the exchange resource indicator is within a first range;
   providing the exchange resource indicator from the second cache in the adapter if the exchange resource indicator is within a second range and is stored on the second cache;
   providing the exchange resource indicator from a host memory if the exchange resource indicator is within the second range and is not stored on the second cache, the host memory being disposed outside of the adapter; and
   providing the exchange resource indicator from the electronic context memory if the exchange resource indicator is within the second range and a page address translation entry indicates a remap operation with a direct context memory address.

2. The method of claim 1, further comprising:
   pinning the exchange resource indicator in the second cache for a particular input/output exchange phase.

3. The method of claim 2, wherein the particular input/output exchange phase is a non-end sequence phase.

4. The method of claim 1, further comprising:
   pinning the exchange resource indicator in the second cache based on a first-come first-served basis, provided a pin limit has not been reached.

5. The method of claim 4, wherein the pin limit comprises a programmable PIN count per set index.

6. The method of claim 1, further comprising:
   pinning the exchange resource indicator in the second cache based on an address of the request being within a certain programmable virtual context address (VCA) range.

7. The method of claim 1, further comprising:
   pinning the exchange resource indicator in the second cache based on a size of the request being within certain programmable pin IO size ranges.

8. The method of claim 1, further comprising:
   optionally pinning the exchange resource indicator in the second cache based on an exchange resource indicator number corresponding to the request being within a certain exchange resource indicator range.

9. The method of claim 1, further comprising:
   pinning the exchange resource indicator in the second cache based on a fibre channel, SCSI, NVMe, or FICON protocol.

10. The method of claim 1, further comprising:
    pinning the exchange resource indicator in the second cache based on a WQ profile configuration.

11. The method of claim 1, further comprising:
    pinning the exchange resource indicator in the second cache based on a PIN bit directed by a host driver.

12. A bus adapter for a storage network, comprising:
    a context memory comprising a first storage for uncacheable exchange resource indicators and a second storage for cacheable exchange resource indicators; and
    a host backing store unit configured to provide a pinning operation for the cacheable exchange resource indicators based upon a client request, the pinning being based upon at least one of an input/output phase, a first in line up to a limit, a region of a virtual context address associated with the cacheable exchange resource indicators, a protocol associated with the cacheable exchange resource indicators, a size of a transaction associated with the cacheable exchange resource indicators, or work queue information associated with the cacheable exchange resource indicators;
    direct memory access engines in communication with the host backing store unit and
    protocol offload engines in communication with the host backing store unit and wherein the host backing store unit comprises a crossbar, a page address translation table comprising a page translation cache, and a cache controller.

13. A host bus adapter for a storage network comprising a host, the host having a host memory, the host bus adapter comprising:
    a context memory comprising a first storage for uncacheable exchange resource indicators and a second storage for cacheable exchange resource indicators; and
    a host backing store unit disposed on the host bus adapter and configured to:
       provide an exchange resource indicator from the first storage if the exchange resource indicator is within a first range in response to a request;
       provide the exchange resource indicator from a second cache in the host bus adapter if the exchange resource indicator is within a second range and is stored on the second cache in response to the request;
       provide the exchange resource indicator from the host memory if the exchange resource indicator is within the second range and is not stored on the second cache in response to the request; and
       providing the exchange resource indicator from the context memory if the exchange resource indicator is within the second range and a Page Address Translation entry indicates a remap operation with a direct context memory address.

14. The bus adapter of claim 12, wherein the context memory comprises a third storage for cacheable remapped exchange resource indicators in a second tier.

15. The host bus adapter of claim 13, further comprising:
    direct memory access engines in communication with the host backing store unit;

protocol offload engines in communication with the host backing store unit; and wherein the host backing store unit comprises a crossbar, a page address translation table comprising a page translation cache, and a cache controller.

16. The bus adapter of claim 12, wherein the bus adapter is a converged ethernet network adapter.

17. The host bus adapter of claim 13, further comprising:
direct memory access engines in communication with the host backing store unit; and
protocol offload engines in communication with the host backing store unit.

18. The host bus adapter of claim 13, wherein the host backing store unit is configured to provide an optional pinning operation for the cacheable exchange resource indicators based upon at least one of an input/output phase, a first in line up to a limit, a region of a virtual context address associated with the cacheable exchange resource indicators, a protocol associated with the cacheable exchange resource indicators, a size of a transaction associated with the cacheable exchange resource indicators, or work queue information associated with the cacheable exchange resource indicators.

19. The host bus adapter of claim 13, further comprising:
an allocation and deallocation server configured to allocates cacheable and uncacheable exchange resource indicators based upon address range.

20. The host bus adapter of claim 18, wherein the context memory comprises a third storage for cacheable remapped exchange resource indicators in a second tier.

21. The host bus adapter of claim 13, wherein a pool selection automatically provides a tier one pool to link to a tier two pool and tier two pool resources are allocated when tier one pool resources are exhausted.

22. The host bus adapter of claim 13, wherein a pool selection automatically provides a tier one pool to link to a tier two pool, and tier two pool resources are allocated when tier one pool resources are exhausted, and wherein a requesting agent does not have to make two XRI allocation requests if the tier one pool is empty.

* * * * *